United States Patent [19]

Motycka

[11] Patent Number: 4,631,959
[45] Date of Patent: Dec. 30, 1986

[54] DRAG ANEMOMETER

[75] Inventor: Jiri Motycka, Etobicoke, Canada

[73] Assignee: Metrex Instruments Ltd., Brampton, Canada

[21] Appl. No.: 682,208

[22] Filed: Dec. 14, 1984

[51] Int. Cl.$^4$ ............................ G01W 1/02; G01P 5/02
[52] U.S. Cl. .................................... 73/189; 73/861.71; 73/862.61
[58] Field of Search .................. 73/189, 170 A, 517 B, 73/861.71, 862.61

[56] References Cited

FOREIGN PATENT DOCUMENTS 1408139 10/1975 United Kingdom ................... 73/189
2052047 1/1981 United Kingdom ............... 73/517 B

OTHER PUBLICATIONS

Dessureault et al., "Design of a Tri-Axial Thrust Anemometer for Measurement of Atmosperic . . .", Ocean Engng., vol. 7, No. 4 (1980), pp. 521–537.

Primary Examiner—Charles A. Ruehl
Attorney, Agent, or Firm—Panitch, Schwarze, Jacobs & Nadel

[57] ABSTRACT

An anemometer for measuring the velocity of a fluid. The anemometer has a pivotally mounted shaft with a drag element mounted thereon for exposure to the fluid. Electromagnets are orthogonally located adjacent to a ferrite block on the shaft, and changes in position of the shaft are sensed by changes in voltage across the electromagnets. A controller senses these voltage changes and applies current to the electromagnets to produce electromagnetic force to restore the position of the shaft and balance the fluid force on the drag element. A micro-processor computes fluid speed and direction from the current applied to the electromagnets.

18 Claims, 7 Drawing Figures

DRAG ANEMOMETER

BACKGROUND OF THE INVENTION

This invention relates to apparatus for the measurement of velocity of fluids, such as wind, and in particular to drag or thrust anemometers.

In the past, drag elements have been used for the measurement of both the speed and direction of fluid flow, such as wind or water. In a drag anemometer, a drag element having a spherical or similar shape is positioned in the fluid to be measured, and the flow of the fluid causes a drag force to be exerted on the drag element which is proportional to the square of the velocity of the fluid impinging on the drag element. Various methods have been used to sense both the magnitude or speed of this fluid flow and the direction of the flow. Direction is usually measured by sensing the force of the flow in two or three orthogonal directions and from this computing the true flow direction. The magnitude or speed of the flow is usually sensed by measuring the strain in or deflection of some member attached to the drag element. Gravitational or spring bias means are usually employed to offset the flow drag force on the drag element.

An example of one of these prior art devices is shown in U.S. Pat. No. 3,212,329 issued on Oct. 19, 1965 to A. Bisberg. In the type of device shown in this patent, displacement of the drag element in three axes is measured and the deflection of the drag element is opposed by the action of spring plates.

Another example of such a prior art device is shown in U.S. Pat. No. 3,264,869 issued on Aug. 9, 1966 to L. Erdely. This is a type of device that uses gravitational forces to bias the drag element and offset the drag force. The fluid speed and direction of flow is determined from a measurement of the displacement of the drag element along two orthogonal axes.

A difficulty with the prior art devices is that they attempt to calculate speed and direction of flow by measuring the displacement of the drag element and this displacement is a function of the spring or gravitational restoring forces applied to offset the fluid drag forces on the drag element. The result is that these devices have poor sensitivity in the low range of flow velocities because the dynamic forces causing displacement of the drag element are very low due to the quadratic relationship between the flow velocity and the drag force. Further, many of the prior art devices suffer from inaccuracy caused by hysteresis.

It is an object of the present invention to overcome the deficiencies of the prior art devices by balancing the flow drag force on the drag element with an electromagnetic force and measuring the current to produce this electromagnetic force. Since the electromagnetic force is proportional to the square of the current used to produce this force (with the position of the drag element remaining relatively constant), there is a direct or linear relationship between this current and the flow velocity.

SUMMARY OF THE INVENTION

According to the invention, an anemometer is provided for measuring the velocity of a fluid, comprising a housing having an elongate shaft pivotally mounted therein and projecting therefrom, the shaft being moveable from a neutral position in response to magnetic forces thereon. A drag element is mounted on the shaft exterior of the housing. Electromagnetic means are located adjacent to the shaft. Position sensing means are connected to the electromagnetic means for producing signals responsive to the position of the shaft relative to the electromagnetic means. Also, controller means are operatively connected between the position sensing means and the magnetic means for applying direct current to the magnetic means to return the shaft to the neutral position, the current applied to the magnetic means being proportional to the speed of the fluid impinging on the drag element.

A preferred emobodiment of the invention will now be described, by way of example with reference to the accompanying drawings.

Figure 1:
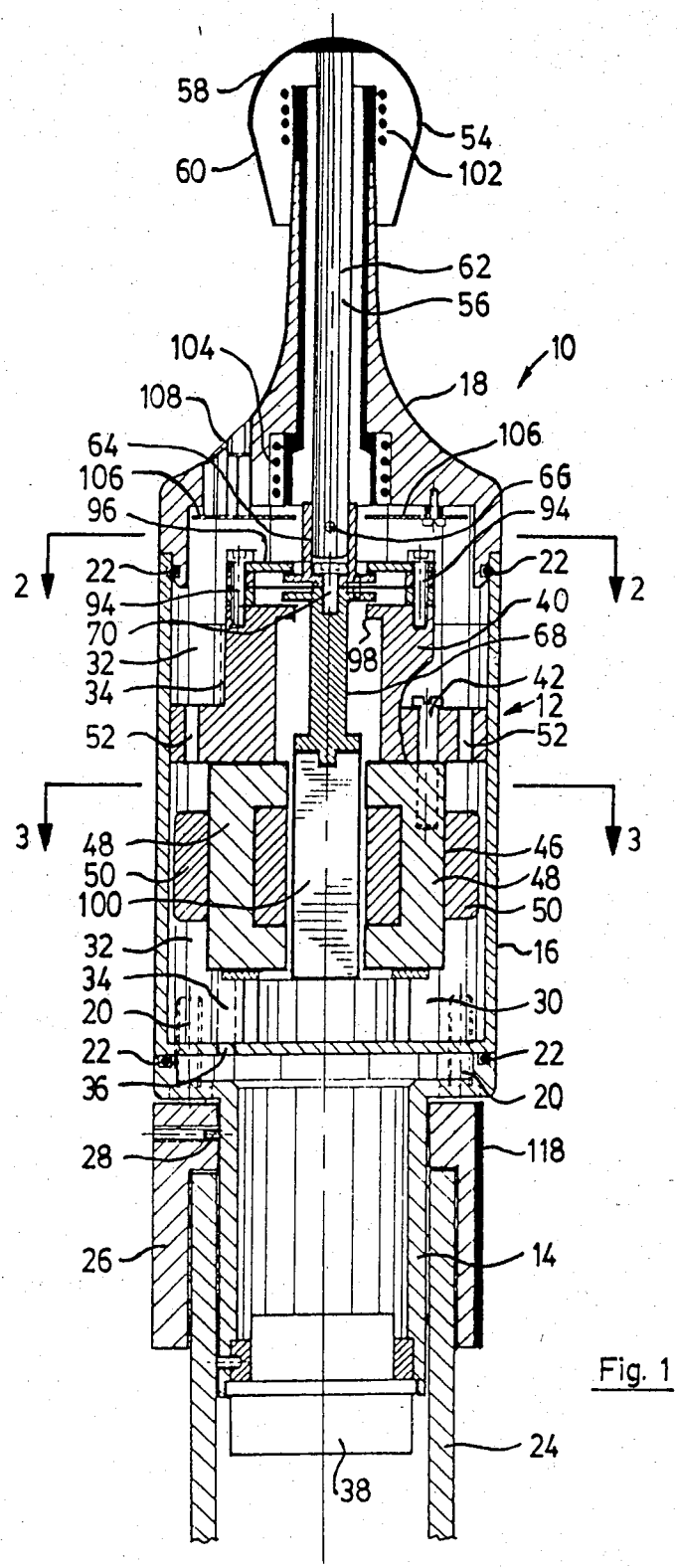
FIG. 1 is a vertical sectional view of a preferred embodiment of a drag anemometer according to the present invention.
Figure 2:
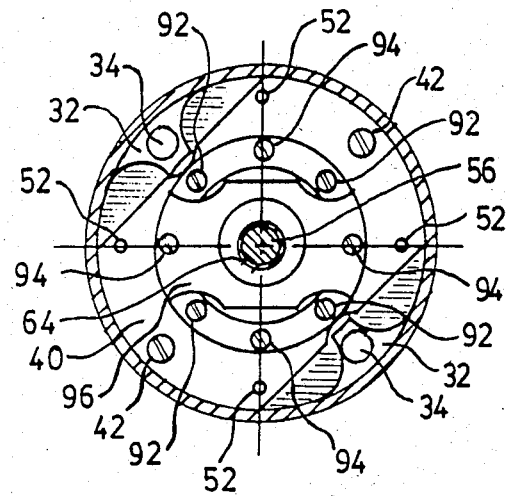
FIG. 2 is a sectional view taken along lines 2—2 of FIG. 1.
Figure 4:
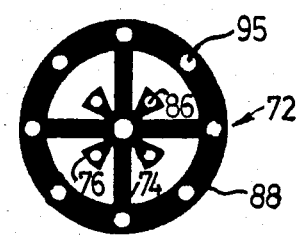
FIG. 4 is a plan view of the transverse resilient element used to pivotally mount the shaft in the anemometer.

Referring to the drawings, a preferred emobodiment of a drag anemometer according to the present invention is generally indicated by reference numeral 10. Anemometer 10 includes a housing 12 having a lower mounting element 14, a central cup member 16 and an upper cone 18. Cone 18 is attached to cup member 16 by a friction fit and cup member 16 is attached to mounting element 14 using suitable threaded fasteners 20. O-ring seals 22 are provided at the junctions of the various housing elements.

DETAILED DESCRIPTION OF PREFERRED EMBODIMENTS

In FIG. 1, anemometer 10 is shown mounted on a suitable mast tube 24. A clamp (not shown) is located around mast tube 24 to tighten the mast tube onto mounting element 14 to retain anemomter 10 in position. A collar 26 is mounted on mounting element 14 by a set screw 28 for a purpose which will be described further below.

Figure 3:
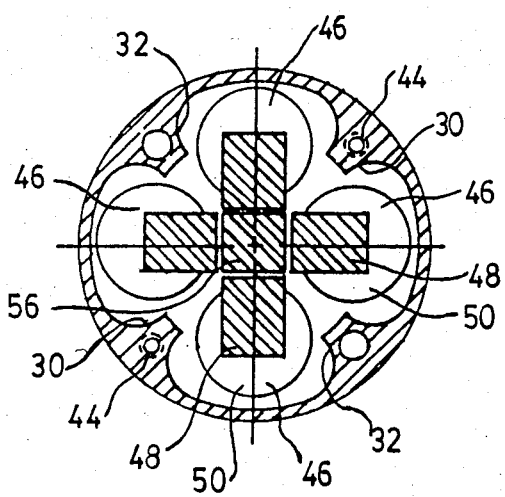
FIG. 3 is a sectional view taken along lines 3—3 of FIG. 1.

Referring in particular to FIGS. 1 and 3, cup member 16 has a pair of diametrically opposed shorter, longitudinal, inner ribs 30, and a pair of diametrically opposed longer, longitudinal, inner ribs 32. Longer ribs 32 have longitudinal holes 34 therethrough for the passage of wires as will be discussed further below, and for this purpose, cup member 16 has bottom holes 36 in registration with holes 34 for the passage of the wires down into the inside of mounting element 14. A suitable connector 38 is mounted in the bottom of mounting element 14 for attachment of the wires for the components inside anemometer 10.

A central mounting block 40 is located inside cup member 16 and is held in position by a pair of diametrically opposed screws 42 (only one of which is visible in FIG. 1) which are screwed into threaded holes 44 in shorter ribs 30. Four orthogonally disposed electromagnets 46 are adhesively attached to the underside of mounting block 40. Electromagnets 46 include ferrite C-cores 48 and coils 50. The wires from coils 50 pass up through holes 52 in mounting block 40 and down through holes 34 in the cup member longer ribs 32 to connector 38. For the purposes of clarity, these wires have been omitted from the drawings.

Anemometer 10 includes a drag element 54 which is mounted on an elongate shaft 56 which is axially located inside housing 12. Drag element 54 has a spherical top portion 58 and a conical lower portion 60 and is made by electro-forming nickle into the desired shape and then applying a black coating on the interior surface of drag element 54 to absorb infrared radiation for de-icing purposes as will be discussed further below.

Shaft 56 has an upper portion 62 which is removably mounted in an upper flange member 64 by a detent 66. Upper flange member 64 is connected to a lower flange element 68 by an axially located screw 70. A transverse resilient element 72 is sandwiched between upper and lower flange members 64, 68 for pivotally mounting shaft 56 inside anemometer 10. Resilient element 72 is formed of spring steel and has four longer radial elements 74 and four intermediate, shorter radial elements 76. The longer radial elements 74 pass through recesses 78 in the upper and lower flange members 64, 68, and the outer ends of the shorter radial elements 76 are clamped in position by partial annular flanges 80. Alignment pins 82 pass through openings 84 in upper flange member 64, through openings 86 in the outer ends of shorter radial elements 76, and into the lower flange member 68 to align resilient element 72 and prevent rotation of same about shaft 56.

Figure 5:
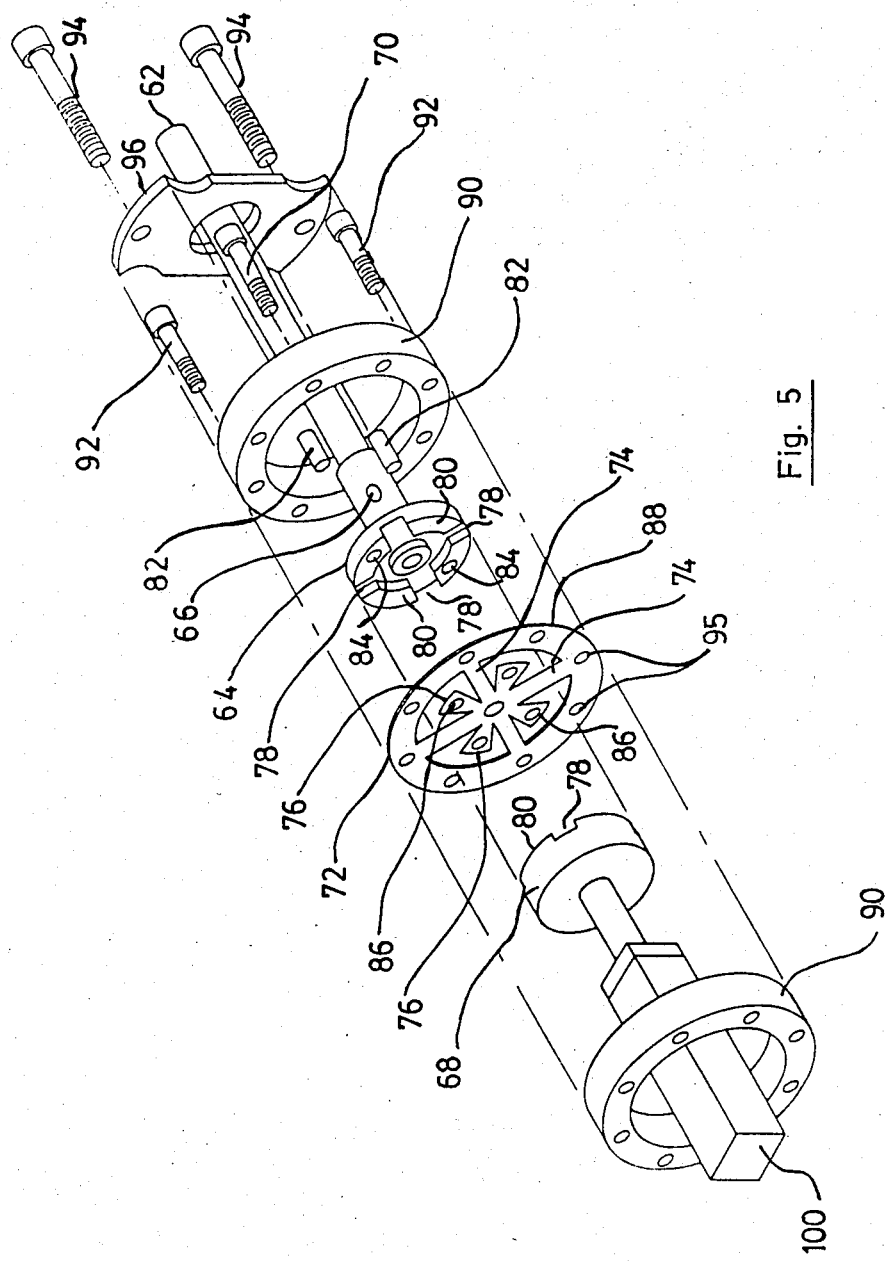
FIG. 5 is an exploded perspective view of the assembly for mounting the shaft in the anemometer.

Resilient element 72 has an outer annular portion 88 which is clamped between a pair of retaining rings 90 by four orthogonally located screws 92 (only two of which are shown in FIG. 5). The clamped together retaining rings 92 are then mounted on mounting block 40 by four additional screws 94 (again only two of screws 94 are shown in FIG. 5). Screws 92, 94 pass through openings 95 in annular portion 88 to prevent rotation of resilient element 72. A top plate 96 is also retained in position by screws 94. As seen best in FIG. 1, top plate 96 and inwardly directed flanges 98 on mounting block 40 act as stops for retaining rings 90 to prevent excess vertical movement of shaft 56. The assembly of shaft 56 is completed by a ferrite block 100 adhesively attached to the lower end of lower flange member 68.

The location of transverse resilient element 72 in shaft 56 is such that this transverse element is located at the centre of gravity of shaft 56. The positioning of the longer and shorter radial elements 74, 76 in upper and lower flange members 64, 68 is such that the resistance to pivoting movement of the shaft 56 in all directions is minimized.

Cone 18 has a heating element 102 mounted thereon inside drag element 54, and a second heating element 104 mounted adjacent to the shoulders of cone 18. Heating elements 102, 104 are used to de-ice drag element 54 and cone 18, and for this purpose they are electrically connected to circuit boards 106 mounted on the underside of cone 18. The wiring for this heating system is not shown in the drawings for the purposes of clarity, but the ice sensing element will now be described in detail with reference to FIG. 6.

Figure 6:
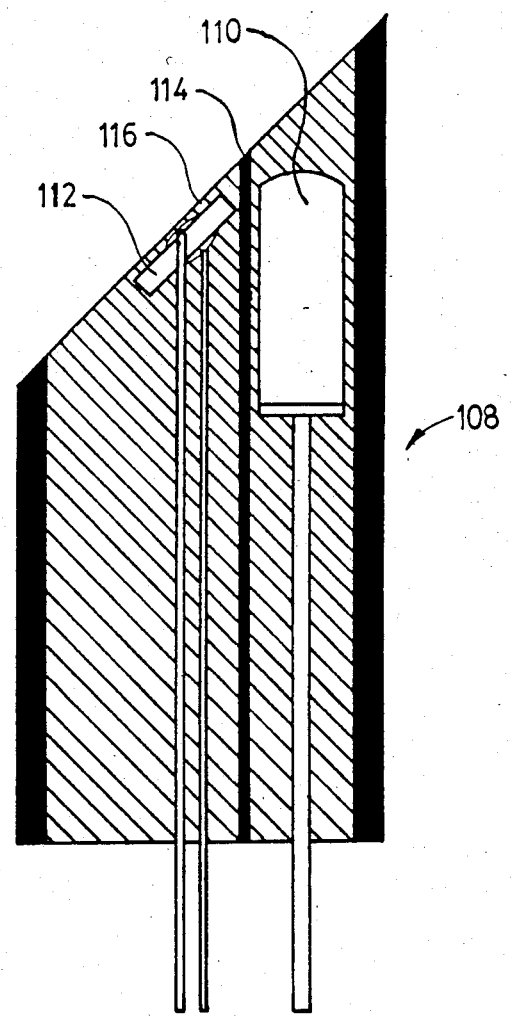
FIG. 6 is a diagramatic sectional view of an ice sensor used in the anemometer of FIG. 1.

FIG. 6 shows an ice sensor 108 and there are three equi-spaced ice sensors mounted in the shoulder area of cone 18, although only one is shown in FIG. 1. Ice sensor 108 includes a light-emitting diode 110 and a photoelectric detector 112 both of which are embedded in transparent acrylic and separated by an opaque partition 114. When ice forms on sensor surface 116, light from the light-emitting diode 110 is scattered through the ice over partition 114 to photo-electric detector 112 and this produces a signal that energises the two heating elements 102, 104. The heating elements remain on for a predetermined time interval, for example 15 minutes, which is sufficiently long enough to melt the ice on drag element 54 and cone 18.

In order for anemometer 10 to measure true wind direction it is necessary that the anemometer be orientated in the field. For this purpose, collar 26 is provided having a directional device such as a mirror 118. Collar 26 is positioned during assembly of anemometer 10 so that mirror 118 faces a preselected direction, such as south. During installation of anemometer 10, the anemometer is rotated on mast tube 24 until a light beam reflecting on mirror 18 is aligned with the preselected direction. The anemometer is then clamped into position. Other means of aligning anemometer 10 in a preselected direction will be apparent to those skilled in the art.

In the preferred embodiment of anemometer 10, electronic damping is used for shaft 56 as described further below, but if this is not desired, the housing member 16 can be partially filled with a suitable damping fluid such as silicone oil.

Figure 7:
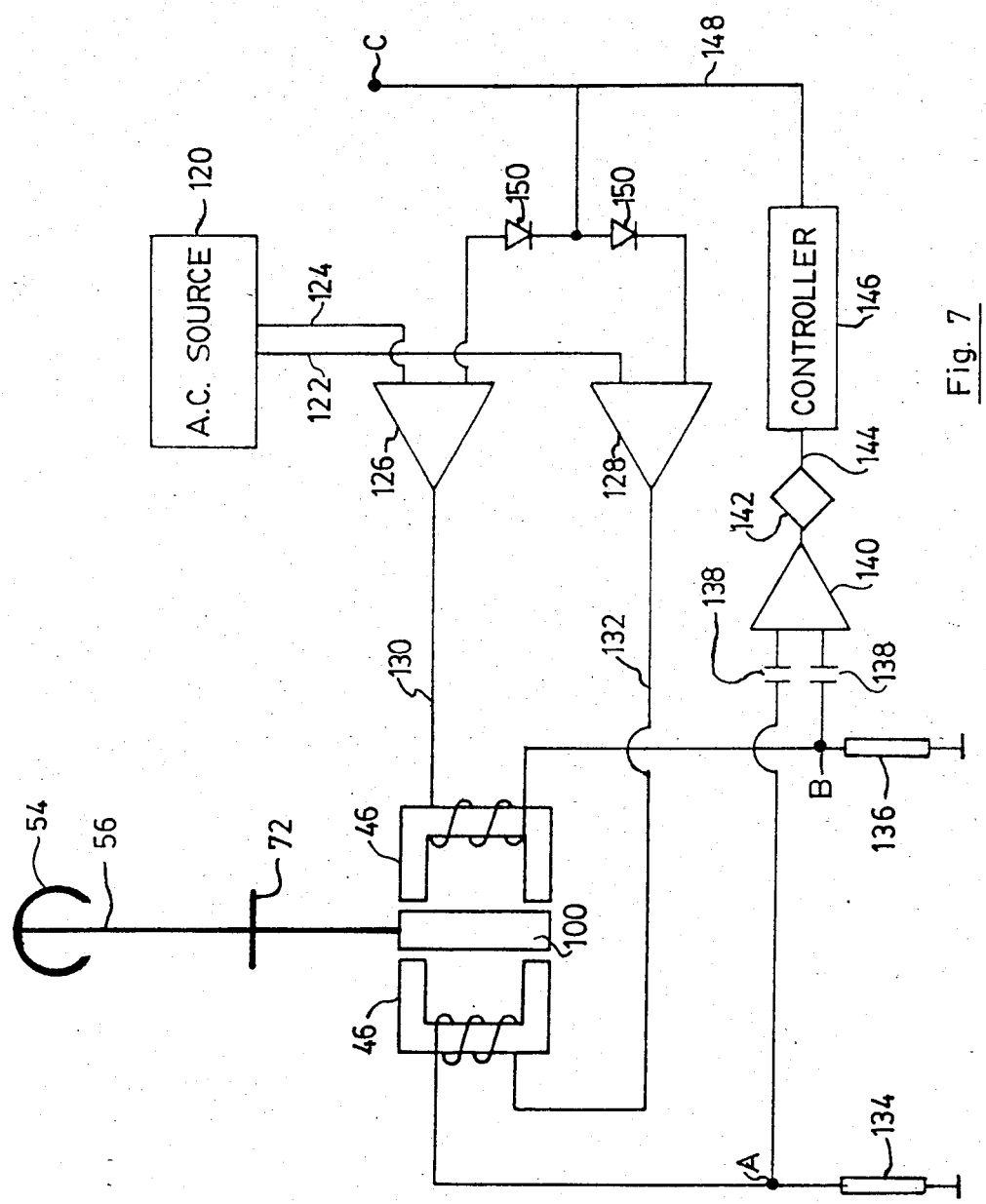
FIG. 7 is a block diagram of one-half of the electrical circuit used in the anemometer of FIG. 1.

The operation of anemometer 10 will now be described with reference to FIG. 7, in which is shown one-half of the electronic circuit for measuring wind speed and direction. As mentioned above and shown best in FIG. 3, there are two pairs of opposed electromagnets 46 in anemometer 10 and these pairs of electromagnets are orthogonally disposed with the shaft ferrite block 100 centrally located between the electromagnets. In FIG. 7, one of these pair of electromagnets is shown, it being understood that there would be a second pair of electromagnets orthogonally disposed with respect to the pair shown, the electrical components and operation of the second pair of electromagnets being similar to that about to be described, as will be apparent to those skilled in the art.

The electronic circuit for anemometer 10 includes an alternating current source 120 which has outputs 122, 124 at a frequency of approximately 8 kHz for each electromagnet 46. AC outputs 122, 124 are fed to integrated circuits 126, 128, which add or sum AC and DC signals to produce combined outputs 130, 132. The AC component of combined outputs 130, 132 passes through respective electromagnets 46, the magnitude of this current being dependent upon the impedance of the electromagnets or the relative reluctances of the two opposing magnetic circuits. The AC current circuits are completed by further impedance devices 134, 136 such as resistors or coils, so that voltages are produced at points A and B which are proportional to the respective impedances of electromagnets 46. It will be appreciated that as the ferrite block 100 of the shaft 56 moves relative to electromagnets 46, the relative impedances of these electromagnets will change resulting in a voltage drop between points A and B proportional to the position of shaft 56.

The voltage difference between points A and B is fed by coupling capacitors 138 to a differential amplifier integrated circuit 140, the output of which is a signal proportional to the displacement or tilt of shaft 56. This output then passes through a rectifier and filter device or synchronous detector 142 producing a DC signal in line 144 which is proportional to the position or angle of inclination of shaft 56. It will be appreciated that the DC signal in line 144 will be positive or negative depending upon which electromagnet 46 the shaft ferrite block 100 is closest to. It will also be appreciated that the DC signal in line 144 can be increasing or decreasing depending upon the movement of the ferrite block 100 in the plane of electromagnets 46.

The DC signal in line 144 is then fed into a controller 146 which is a suitable analog system or micro-computer for processing the incoming signals and producing DC output currents to operate electromagnet 46. Controller 146 produces a DC output signal or current having a first component which is proportional to the DC positional signal in line 144, and this first component of the output signal is fed through line 148 to a pair of diodes 150. Depending upon the polarity of this first component of the output signal, it will be fed into either integrated circuit 126 or 128 and then to the respective electromagnet 46 to cause the electromagnet to return shaft 56 to the centre or neutral position. Thus, DC current is fed to only one electromagnet 46 at a time.

Controller 146 also produces a second component of the DC output signal which is responsive or proportional to the integral of the DC position input signal in line 144. This second integral component of the DC output signal is also fed through line 148, and depending upon the polarity, through the respective diode 150, integrated circuit 126 or 128 and then to the respective electromagnet 46. The second integral component of the DC signal keeps shaft 56 in the centre or neutral position thus maintaining relatively constant air gaps between electromagnets 46 and ferrite block 100. As a result of these constant air gaps, the electromagnetic force produced by the electromagnets is proportional to the square of the current passing therethrough, as will be appreciated by those skilled in the art.

Controller 146 also produces a third component of the DC output signal which is responsive or proportional to the rate of change of the DC input signal in line 144. The polarity of this third output signal is such that it reverses the rate of change of the position signal and thus effects damping of shaft 56.

If desired, controller 146 can be used to produce an additional small DC current to be constantly applied to electromagnets 46 to pre-bias the movements of shaft 56 about the neutral position to improve the zero stability of the device.

As mentioned above, since the DC position signal in line 144 is proportional to the voltage difference between the pair of electromagnets or voltage difference between points A and B, the output signals of controller 146 are thus responsive or proportional to the voltage difference between the respective pair of electromagnets.

It will be appreciated that the AC part of the circuit is used to sense the position of shaft 56 and the DC part of the circuit is used to control the position of shaft 56, the electromagnets 46 being used both for the purposes of sensing and controlling the position of the shaft.

Although it has been mentioned above that FIG. 7 shows only one-half of the total anemometer circuit, it will be appreciated that the AC current source 120 could be used for both halves of the circuit and controller 146 as well could be designed to handle both halves of the circuit.

In operation, the flow of the fluid impinging upon drag element 54 tends to cause shaft 56 to pivot about resilient element 72 pushing ferrite block 100 away from one electromagnet 46 and toward the opposed electromagnet 46. The DC output signals produced by controller 146 pass through the respective electromagnet 46 to tend to pull shaft 56 back into the centre or neutral position. Thus, the force of the fluid on drag element 54 is balanced by the electromagnetic force tending to pull shaft 56 back into the neutral position. Since this electromagnetic force is proportional to the square of the DC restoring current, and since the force of the fluid impinging on drag element 54 is proportional to the square of the speed of this flow, there is a generally linear relationship between fluid speed and the DC restoring current in line 148. This restoring current can be picked up at point C in FIG. 7 and similar signals produced from the orthogonally disposed electromagnets 46 can be used to determine or calculate the direction and speed of the fluid impinging upon drag element 54.

Having described the preferred embodiments of the invention, it will be appreciated that various modifications may be made to the structures described. For example, instead of measuring the voltage differential between each electromagnet of a pair at points A and B of FIG. 7, it is possible to measure the AC current phase shifts caused by the movement of ferrite block 100 relative to the electromagnets. Suitable modifications for this purpose would be apparent to those skilled in the art. Other arrangements of electromagnets are also possible with perhaps a single electromagnet in each orthogonal direction in conjunction with a magnetic block on shaft 56 rather than a ferrite block. Other means could be used to suspend shaft 56 in anemometer 10 and other arrangements for pivotally mounting shaft 56 in anemometer 10 could be employed as well.

From the above, it will be appreciated that the anemometer of the present invention is a force-balance anemometer utilizing a novel principle in which the wind force is opposed by an internally generated electromagnetic force, so that the central shaft is generally motionless. The anemometer is capable of measuring wind velocities between 5 cm per second and 100 or more meters per second with increased accuracy due to the linear relationship between wind speed and the output signals.

What I claim as my invention is:

1. An anemometer for measuring the velocity of a fluid, comprising: a housing having an elongate shaft pivotally mounted therein and projecting therefrom, the shaft being moveable from a neutral position in response to drag forces thereon and returnable to a neutral position in response to electromagnetic forces thereon; a drag element mounted on the shaft exterior of the housing; electromagnetic means located adjacent to the shaft; position sensing means connected to the electromagnetic means for producing signals responsive to the position of the shaft relative to the electromagnetic means; and controller means operatively connected between the position sensing means and the electromagnetic means for applying direct current to the electromagnetic means to return the shaft to said neutral position, the current applied to the electromagnetic means being proportional to the speed of the fluid impinging on the drag element.

2. An aneomometer as claimed in claim 1 wherein the electromagnetic means includes at least two electromagnets orthogonally disposed about the shaft, there being a position sensing means connected to each electromagnet and controller means connected between each of the respective position sensing means and associated electromagnets.

3. An anemometer as claimed in claim 2 wherein the electromagnetic means includes two pairs of opposed electromagnets, said pairs being orthogonally disposed with the shaft centrally located between the electromagnets.

4. An anemometer as claimed in claim 3 wherein the position sensing means includes means for feeding each of the electromagnets of a pair of electromagnets with alternating current, and means for measuring the voltage or current difference therein caused by movement of the shaft relative thereto.

5. An anemometer as claimed in claim 4 wherein the controller means includes means responsive to the voltage difference between said pair of electromagnets, and means for feeding a first direct current signal to the electromagnets, the first direct current signal being proportional to said voltage difference, so that the electromagnets return the shaft to the neutral position.

6. An anemometer as claimed in claim 5 wherein the controller means includes means repsonsive to the integral of the voltage difference between said pair of electromagnets, and means for feeding a second direct current signal to the electromagnets, the second direct current signal being proportional to said integral of the voltage difference to return the shaft to the neutral position.

7. An anemometer as claimed in claim 6 wherein the controller means includes means responsive to the rate of change in the voltage difference between said pair of electromagnets, and means for feeding a third direct current signal to the electromagnets, the third direct current signal being proportional to said rate of change of the voltage difference, so that the electromagnets reverse said rate of change of voltage difference to effect damping.

8. An anemometer as claimed in claim 5 wherein the controller means includes means responsive to the rate of change in the voltage difference between said pair of electromagnets, and means for feeding a third direct current signal to the electromagnets, the third direct current signal being proportional to said rate of change of the voltage difference, so that the electromagnets reverse said rate of change of voltage difference to effect damping.

9. An anemometer as claimed in claim 5 wherein the housing is partially filled with a damping fluid to effect damping of shaft movements.

10. An anemometer as claimed in claim 5 and further comprising means connected to the controller means for feeding direct current therefrom to only one electromagnet of each pair of electromagnets at a time.

11. An anemometer as claimed in claim 3 wherein the position sensing means includes means for feeding each of the electromagnets of a pair of electromagnets with alternating current.

12. An anemometer as claimed in claim 3 wherein the shaft includes a ferrite block located between the electromagnets.

13. An anemometer as claimed in claim 12 and further comprising means connected to the controller means for feeding direct current therefrom to only one electromagnet of each pair of electromagnets at a time.

14. An anemometer as claimed in claim 12 wherein the shaft is pivotally mounted in the housing at the centre of gravity of the shaft, the drag element being mounted at an outer end portion of the shaft and the ferrite block being mounted at an inner end portion of the shaft.

15. An anemometer as claimed in claim 14 further comprising a transverse resilient element for pivotally mounting the shaft, the resilient element including a plurality of longer radial elements attached to the housing at the outer ends thereof, and a plurality of intermediate shorter radial elements engaging the shaft at the outer ends thereof.

16. An anemometer as claimed in claim 14 and further comprising directional means attached to the housing for orientating the anemometer, so that current output from the controller means can be used to indicate the direction of the fluid flow impinging on the drag element.

17. An anemometer as claimed in claim 12 and further comprising heating means located in the drag element, and ice sensing means mounted in the housing for detecting icing of the anemometer, the ice sensing means being operatively connected to the heating means to activate same and de-ice the anemometer.

18. An anemometer as claimed in claim 3 and further comprising heating means located in the drag element, and ice sensing means mounted in the housing for detecting icing of the anemometer, the ice sensing means being operatively connected to the heating means to activate same and de-ice the anemometer.

* * * * *